United States Patent [19]
Brachert et al.

[11] Patent Number: 5,832,402
[45] Date of Patent: Nov. 3, 1998

[54] MODULAR VEHICLE DYNAMICS CONTROL SYSTEM

[75] Inventors: Jost Brachert, Ditzingen; Elmar Mueller, Markgroeningen, both of Germany; Ralf Hadeler, Farmington Hills, Mich.; Frank Leibeling, Moeglingen, Germany; Juergen Schuh, Markgroeningen, Germany; Michael Schubert, Althengstett, Germany

[73] Assignee: Robert Bosch GMBH, Stuttgart, Germany

[21] Appl. No.: 576,962

[22] Filed: Dec. 22, 1995

[30] Foreign Application Priority Data

Dec. 24, 1994 [DE] Germany ............... 44 46 592.0

[51] Int. Cl.⁶ .................. B60T 8/62; B60T 8/78
[52] U.S. Cl. ........................... 701/72; 303/147
[58] Field of Search ............ 364/426.01, 426.015, 364/426.016, 426.017, 426.023, 426.025, 426.028; 303/146, 147, 148, 149, 150, 154, 155; 701/70, 71, 72, 73, 78, 80, 83

[56] References Cited

U.S. PATENT DOCUMENTS

| | | | |
|---|---|---|---|
| 4,794,539 | 12/1988 | Wallentowitz et al. | 364/426.1 |
| 4,898,431 | 2/1990 | Karnopp et al. | 303/100 |
| 5,079,708 | 1/1992 | Brown | 364/426.016 |
| 5,134,352 | 7/1992 | Matsumoto et al. | 364/426.016 X |
| 5,225,983 | 7/1993 | Ohmura et al. | 364/424.05 |
| 5,255,194 | 10/1993 | Schaufelberger et al. | 364/426.02 |
| 5,275,474 | 1/1994 | Chin et al. | 303/148 |
| 5,311,431 | 5/1994 | Cao et al. | 364/424.05 |
| 5,328,256 | 7/1994 | Ohta et al. | 303/146 |
| 5,332,300 | 7/1994 | Hartmann et al. | 303/146 |
| 5,344,224 | 9/1994 | Yasuno | 303/146 |
| 5,369,580 | 11/1994 | Monji et al. | 364/424.01 |
| 5,371,677 | 12/1994 | Ehret et al. | 364/426.016 |
| 5,455,770 | 10/1995 | Hadeler et al. | 364/426.01 |
| 5,576,959 | 11/1996 | Hrovat et al. | 303/148 X |

FOREIGN PATENT DOCUMENTS

| | | |
|---|---|---|
| 0392164 | 10/1990 | European Pat. Off. . |
| 4219750 | 12/1993 | Germany . |
| 4221030 | 1/1994 | Germany . |
| 4222958 | 1/1994 | Germany . |
| 2258198 | 2/1993 | United Kingdom . |

OTHER PUBLICATIONS

Automotive Handbook, 3rd edition (1993) pp. 610–619, 639–643.

Primary Examiner—Michael Zanelli
Assistant Examiner—Edward Pipala
Attorney, Agent, or Firm—Felfe & Lynch

[57] ABSTRACT

The movement of a vehicle is controlled by actuating actuators which apply a braking force to the wheels. For this purpose, the rotational speeds of the wheels, the steering angle and at least one of the lateral acceleration and the yawing movement of the vehicle are detected. A first module is configured so that the actuators are actuated by means of the actuation signals with the effect of controlling a first variable. The second module is configured so that signals for influencing the actuation signals are formed with the effect of controlling a second control variable. In order to obtain this second control variable, at least the variable which represents the steering angle is processed. The second controller component brings about a control of a variable which is determined at least as a function of the lateral movement or the yawing movement of the vehicle.

14 Claims, 7 Drawing Sheets

1

MODULAR VEHICLE DYNAMICS CONTROL SYSTEM

PRIOR ART

Systems for controlling the dynamics of motor vehicles are known from the prior art in many different kinds of modifications. Here, desired variables are generally determined from measured variables and estimated variables and their adjustment, using individually settable braking torques at the wheel brakes, contributes to stabilizing the handling characteristics. Here, the speed of the wheels, the yaw speed and the steering angle of the vehicle are generally used as measured variable.

U.S. Pat. No. 5,455,770 discloses a modular vehicle dynamics control system which is organized hierarchically and is divided into a vehicle dynamics computer with the subordinate brake control modules and, in a further refinement, a rear-axle steering system. The wheel controller and hydraulic rear-axle steering actuator systems are subordinated to these modules. Above all the untrained driver is supported in critical driving situations by means of such vehicle dynamics control systems. The vehicle is stabilized even in extreme situations and braking can be carried out automatically in critical situations, that is to say without the driver operating the brake pedal. The yaw speed, that is to say the movement of the vehicle about the vertical axis of the vehicle, is controlled. If a low coefficient of friction of the roadway is detected, the desired value for the yaw speed is briefly reduced. If the control difference is high, an active braking intervention takes place.

In the subject-matter of the German Offenlegungsschrift 42 22 958, four vehicle-dynamic situations in which a vehicle may instantaneously find itself, namely braking with a split coefficient of friction, cornering, changing lane and traveling straight ahead, are detected. The following four measurement signals: front-wheel steering angle, vehicle speed, left-hand and right-hand front-wheel braking pressure are present for the detection of these four travel situations. Various variables from which reference points for distinguishing the abovementioned situations are obtained are derived from these four measurement signals. Depending on the travel situation which has been detected, different independent control strategies are selected by various controllers.

Likewise, the German Offenlegungsschrift 42 21 030 discloses a method for detecting the travel situation in a vehicle in which the current travel situation is detected online by evaluating the smallest possible number of measurement signals available in the vehicle. This takes place by using fuzzy logic. Here too, independent control strategies are adapted to the situation by means of various controllers depending on the situation which has been detected (cornering with braking, $\mu$ split).

U.S. Pat. No. 5,311,431 discloses a method for acquiring the yaw speed and/or lateral speed.

For this purpose, the steering angle of the vehicle and the lateral acceleration are measured.

Methods for skidding detection within a vehicle dynamics control system are known for example from U.S. Pat. No. 5,255,194 and the German Offenlegungsschrift 42 19 750.

Conventional anti-lock brake systems for passenger cars or utility vehicles are known for example from "Automotive Handbook", Third edition, 1993, pp 610 to 619 and pp 639 to 643. Different systems for controlling and adjusting the drive train of a motor vehicle are also known from this prior art (pp 536 to 559). These include, for example known traction control systems and gear box control systems.

The object of the present invention consists in designing a vehicle dynamics control system which can be adapted to the respective conditions in a flexible way.

SUMMARY OF THE INVENTION

The invention is based on a vehicle dynamics control system in which a movement variable which represents the movement of a vehicle is controlled. This takes place by actuating actuators in order to apply a braking force to the vehicle wheels. Corresponding detection means are present for detecting the rotational movements of the wheels, the steering angle and at least a variable which represents the lateral movement or the yawing movement of the vehicle. The longitudinal speed of the vehicle can be identified from the rotational movements of the wheels. The core of the invention consists in the actual controller component being divided into two modules.

A first controller component (first module) is configured in such a way that the actuators are actuated by means of the actuation signals with the effect of controlling a first variable. This first control variable is determined at least as a function of the detected rotational movements of the wheels and can be for example the wheel slip and/or the wheel deceleration.

The second controller component (second module) is constructed according to the invention in such a way that signals for influencing the actuation signals with the effect of controlling a second control variable are formed. In order to obtain this second control variable, at least the variable representing the steering angle is processed. A variable which is determined at least as a function of the lateral movement or the yawing movement of the vehicle is controlled by means of the second controller component. The second control variable can therefore be advantageously associated at least indirectly with the lateral movement or the yawing movement of the vehicle.

The clearly organized structure and the flexibility brought about by the modular design are substantial advantages of the vehicle dynamics control system of modular design according to the invention. An example of this is that the system according to the invention can be adapted to an extremely wide variety of vehicles without excessive outlay. Thus, for example the first controller component which is constructed as a first module can be a conventional anti-lock brake system whose actuation signals for actuating the wheel brakes are modified by the second control component, constructed as a second module, with the effect of bringing about adjustment to the second control variable. By virtue of this system according to the invention it is possible to react quickly and flexibly to an extremely wide variety of requests relating to the second control variable in the respective vehicles without the controller being made unnecessarily complicated.

In various advantageous embodiments there is provision for the inventive idea of the modular design to be continued in particular within the second controller circuit.

Thus, in one embodiment of the invention there may be provision for the second controller component to have at least two submodules. Here, a reference variable is determined by means of a first submodule for controlling the second control variable. This takes place as a function of at least the variables which represent the longitudinal speed of the vehicle and the steering angle. In a second submodule, the second control variable is then formed and compared with the reference variable, determined in the first submodule, in order to form the signals for influencing the actuation signals of the actuators.

Furthermore, a third submodule may be provided by means of which variables are derived which represent the current travel situation of the vehicle or the environmental conditions to which the vehicle is currently subjected. In particular, there is provision here for the variables which represent the current travel situation to be derived on the basis of the detected rotational movements of the wheels or the detected lateral movement or yawing movement of the vehicle. The variables which represent the current travel situation or the environmental conditions are fed to the submodules already described.

Even greater flexibility of the controller is achieved by virtue of the further modular structuring, according to the invention, of the second controller component. Therefore, depending on the vehicle, the various submodules can be adapted independently of one another to the respective conditions of the vehicle. Depending on the configuration of the vehicle, the reference variable which determines the vehicle behavior can be appropriately modified (first submodule) or an extremely wide variety of travel situations can be allowed for by means of the third submodule.

The third submodule can be configured for example as a device for detecting skidding by means of which a variable which represents the travel stability is formed at least as a function of the detected steering lock and the detected lateral movement or the detected yawing movement of the vehicle by means of a vehicle model. Furthermore, the third submodule can consist of a device for detecting $\mu$ split, a variable which is representative of whether the coefficients of friction of the roadway on the right-hand side and the left-hand side of the vehicle differ to a specific degree. This variable is formed as a function of the detected steering angle and the detected lateral movement or the detected yawing movement of the vehicle and also the detected actuation signals of the actuators or the braking pressures. Finally, in a device for detecting the coefficient of friction within the third submodule, a variable which represents the coefficient of friction of the roadway can be formed as a function of the detected steering angle and as a function of the detected lateral movement or the detected yawing movement of the vehicle by means of a vehicle model.

It is particularly advantageous if, instead of identifying a single value for the reference variable ($fz_{des}$), two limit values are formed for a desired range of reference variables by means of the first submodule. These two limit values ($fz_{min}$ and $fz_{max}$) are dependent not only on the identified reference variable but also on the variables which represent the current travel situation or the environmental influences. The core of this embodiment of the invention consists in the fact that the actuation signals of the actuators are only influenced if the second control variable lies outside the desired range prescribed by the limit values. In this embodiment of the invention there may be provision that an actuation does not take place only when the control variable lies outside the desired range. In order to ensure correctly timed intervention, actuation takes place when it is clear that the control variable is leaving, or will leave, the desired range.

This embodiment of the invention has the advantage that, in the control performed by the first controller component, intervention is only carried out in the first control variable (for example conventional anti-lock brake controller) if the second control variable to be controlled by the second controller component goes outside certain limit values which are dependent on the vehicle and on the environmental influences. Thus, a structure of a superordinate vehicle dynamics controller, which is superimposed on a conventional anti-lock brake system, is obtained. The vehicle dynamic controller which generally has the control of the lateral acceleration of the vehicle and/or the yaw speed of the vehicle as its control objective only intervenes in the control of the subordinate anti-lock brake system (control of the wheel slip or of the wheel deceleration) if the instantaneously present lateral acceleration and/or the yaw speed of the vehicle lies outside the acceptable limit values. The limit values in turn depend on the vehicle and on the respectively prevailing environmental conditions.

In a further advantageous embodiment of the invention, there may be provision that not only the adjustment or control signals of an anti-lock brake system are intervened in by means of the superordinate vehicle dynamics controller (second controller component) but also that for example a traction control system and/or a gearbox control system are provided as further modules. It is known that the traction control system adjusts or controls the wheel slip by forming actuation signals for actuating actuator elements for reducing the wheel drive torque. Gearbox control systems control or adjust the transmission ratio between the engine of the vehicle and the wheels.

In this way, a modular vehicle dynamics control system which is "upwardly compatible" with existing standard controllers is obtained. A hierarchically structured, modular vehicle dynamics control with a superordinate controller for the vehicle movement and subordinate controllers for the vehicle brake (anti-lock brake system) or for the drive train (traction control system, gearbox control system). Here, the subordinate controllers (specifically the anti-lock brake system) can be so-called "stand alone" standard controllers which are only additionally provided with one interface for the superordinate vehicle dynamics controller. This has the advantage that the subordinate controllers do not have to be developed and applied especially. In particular if, as described, the reference variable is configured as a desired range, the subordinate controllers operate independently in wide operating ranges, that is to say without the superordinate vehicle dynamics controller intervening in their control. Individual wheels are only overbraked or underbraked and/or the wheel drive torque is only eliminated in critical travel situations.

In a further advantageous embodiment there is provision for monitoring means to be provided which monitor the correct functioning of the second module and/or the means for detecting the steering lock and/or the lateral movement and/or the yawing movement of the vehicle. If incorrect functioning of one of the elements to be monitored is identified by these monitoring means, the second controller component, that is to say the superordinate vehicle dynamics controller, can be switched off. This can be achieved for example by suppressing the formation of the signals which originate from the second controller means and have the purpose of influencing the actuation signals.

The modular structure with the superordinate vehicle dynamics controller and subordinate series controllers has, by virtue of the monitoring means, a further advantage that when the superordinate controller fails or the sensors necessary for the functioning of the superordinate controller fail, the subordinate standard controllers can each continue to operate independently. Thus, an emergency operating mode is arrived at without the subordinate controllers being dispensed with. This applies in particular to the sensor system failing, the signals of which system are only used in the superordinate vehicle dynamics controller but not in subordinate controllers.

A further embodiment of the invention is based on the fact that the controller-internal variables of the second controller component can be detected as a function of sensor signals of various selectable sensor configurations. In this case, the second controller component is divided into two areas, the first area being adapted to the respectively selected sensor configuration and the second area only processing signals which are independent of the selection of the sensor configuration. This further increases the flexibility and the simple adaptability to the widest variety of vehicle types. The system according to the invention can actually be adapted to an extremely wide variety of sensor configurations in that simply only the first area is adapted to the respective configuration while the second area, the actual core controller, is independent of the sensor configuration.

Further advantageous embodiments can be found in the subclaims.

DRAWING

DETAILED DESCRIPTION OF THE PREFERRED EMBODIMENT

Figure 1:
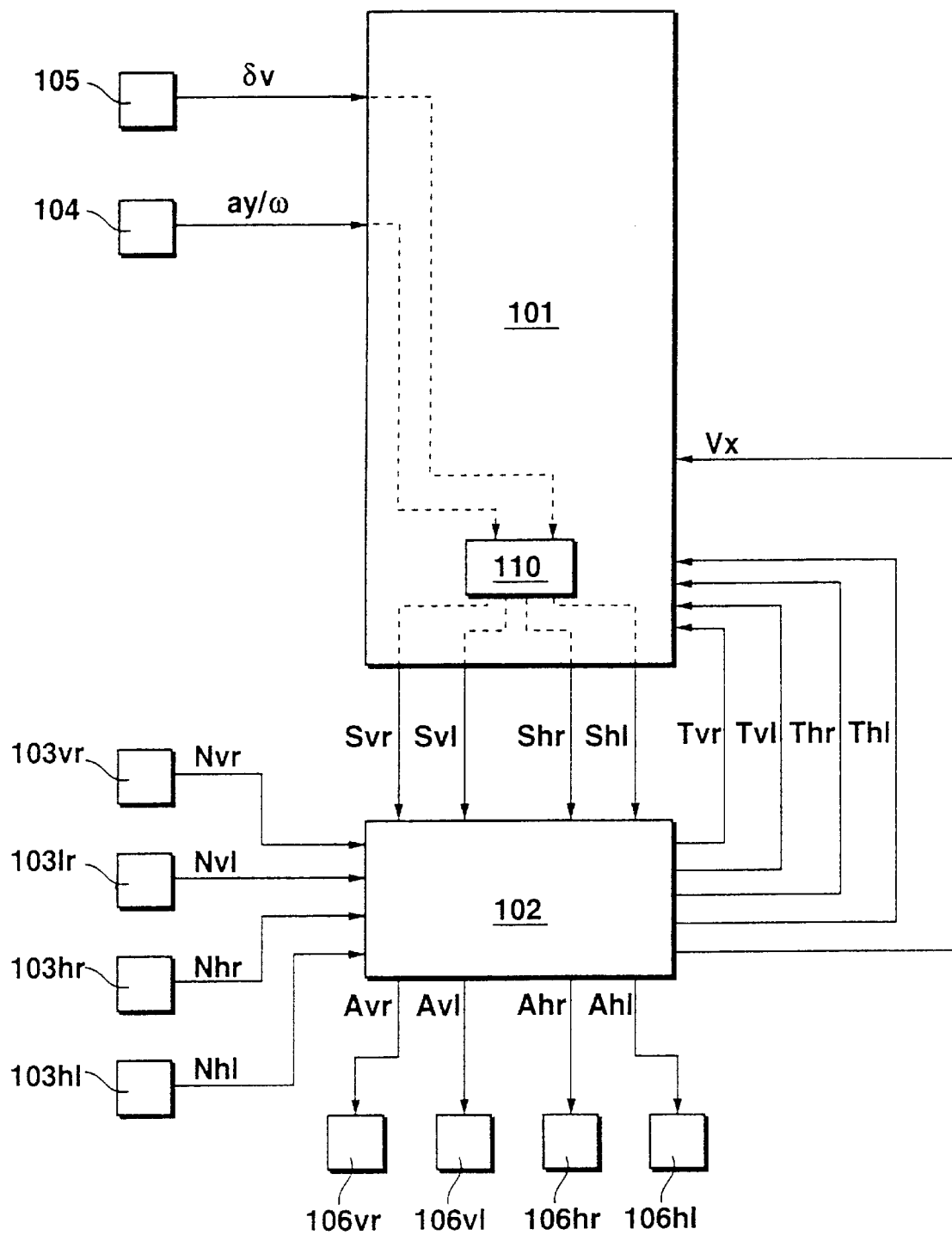
FIG. 1 is a diagram of the overall system.

FIG. 1 shows a first controller component 102 and a second controller component 101. Signals $\delta_y$ of a steering angle sensor 105 are fed to the second controller component. Furthermore, signals from a sensor 104 are fed to the second controller 101. The sensor 104 can sense, as a lateral acceleration sensor, the lateral acceleration $a_y$ of the vehicle at a specific location of the vehicle and/or as yaw speed sensor or two lateral acceleration sensors the yaw angle speed ω, that is to say the angular speed about the vertical axis of the vehicle. Furthermore, the longitudinal speed Vx of the vehicle and the signals Tij are fed to the second controller means 101. The signals Tij represent here the actuation times of the actuators 106ij to be described later. The index i indicates whether the respective variable, the respective actuator or the respective sensor is located at the rear axle (h) or front axle (v). The index j indicates the assignment to the right-hand (r) or left-hand side (l) of the vehicle.

The first controller means 102 which are generally configured in this embodiment as an anti-lock brake system process the signals Nij of wheel speed sensors 103ij. Variables which represent the wheel slip and/or the wheel deceleration are formed as a function of the wheel speeds in the first controller means 102. In order to adjust or control these variables, the wheel brakes 106ij are actuated by the actuation signals Aij. The signals Tij already mentioned indicate the actuation times of the individual wheel brakes. These actuation times Tij and the longitudinal speed Vx of the vehicle are formed in the first controller component 102 and, as already mentioned, are fed to the second controller means 101. Instead of the actuation time signals Tij, the braking pressures at the individual wheel brakes can also be measured. However, this requires an extended sensor system.

Furthermore, in FIG. 1, a monitoring unit 110 which monitors the input signals of the sensors 104 and 105 and, if appropriate, can act on the output signals Sij of the second controller component 101 is depicted within the second controller component 101.

The functioning of the first controller component 102, or of the first module, will not be described here in greater detail since it is an anti-lock brake system which is known sufficiently from the prior art. In this respect, the relevant prior art which is mentioned for example in the introduction to the description can be referred to. The longitudinal speed Vx of the vehicle is also formed from the wheel speeds Nij in a known manner. For this purpose, for example the speeds Nij of the wheels can be logically connected in a weighted manner. With regard to the present invention, all that needs to be mentioned is that the wheel brakes 106ij are actuated as a function of the wheel speeds Nij by means of the first controller component with the effect of controlling the wheel slip and/or the wheel deceleration. The second controller component 101 intervenes in these actuations, when required, by means of the output signals Sij. For the purpose of further explanation we will now proceed to FIG. 2.

Figure 2:
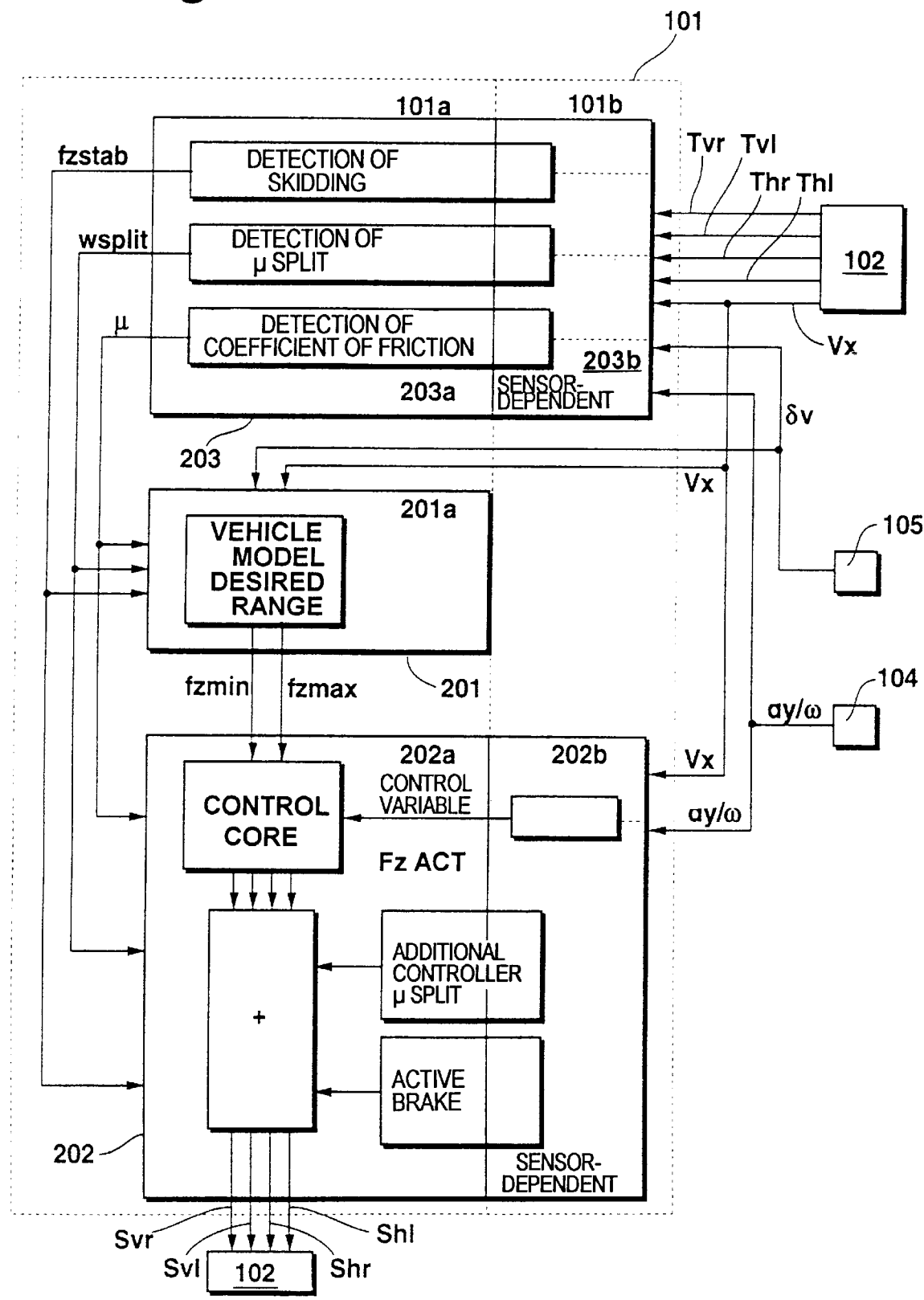
FIG. 2 is a diagram of the second (superordinate) controller including the first, second and third submodules.
Figure 5:
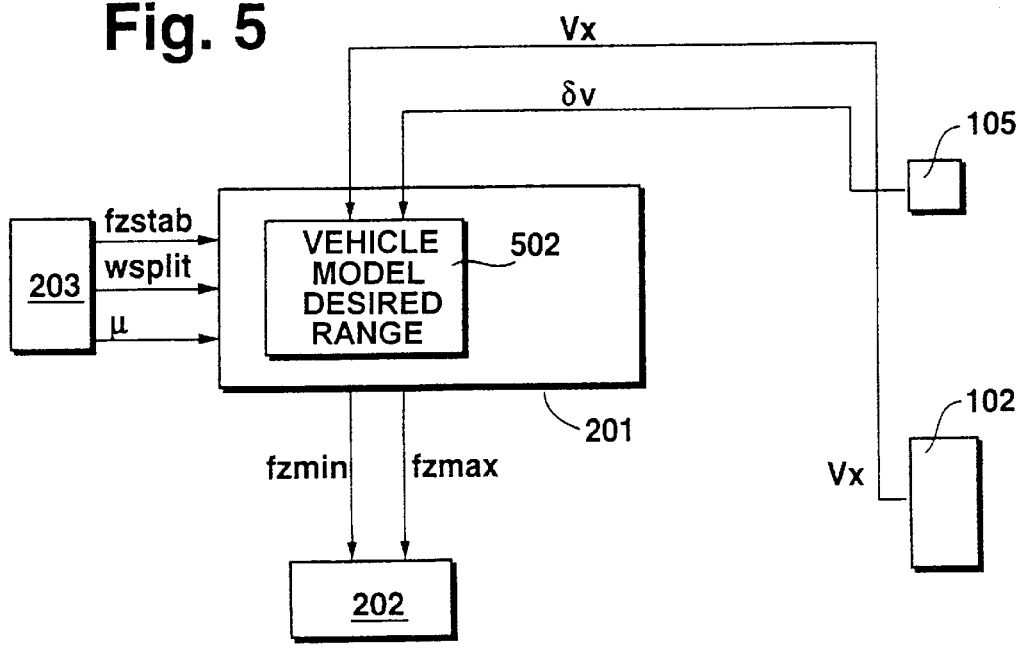
FIG. 5 is a detailed diagram of the inputs of the first submodule.
Figure 6:
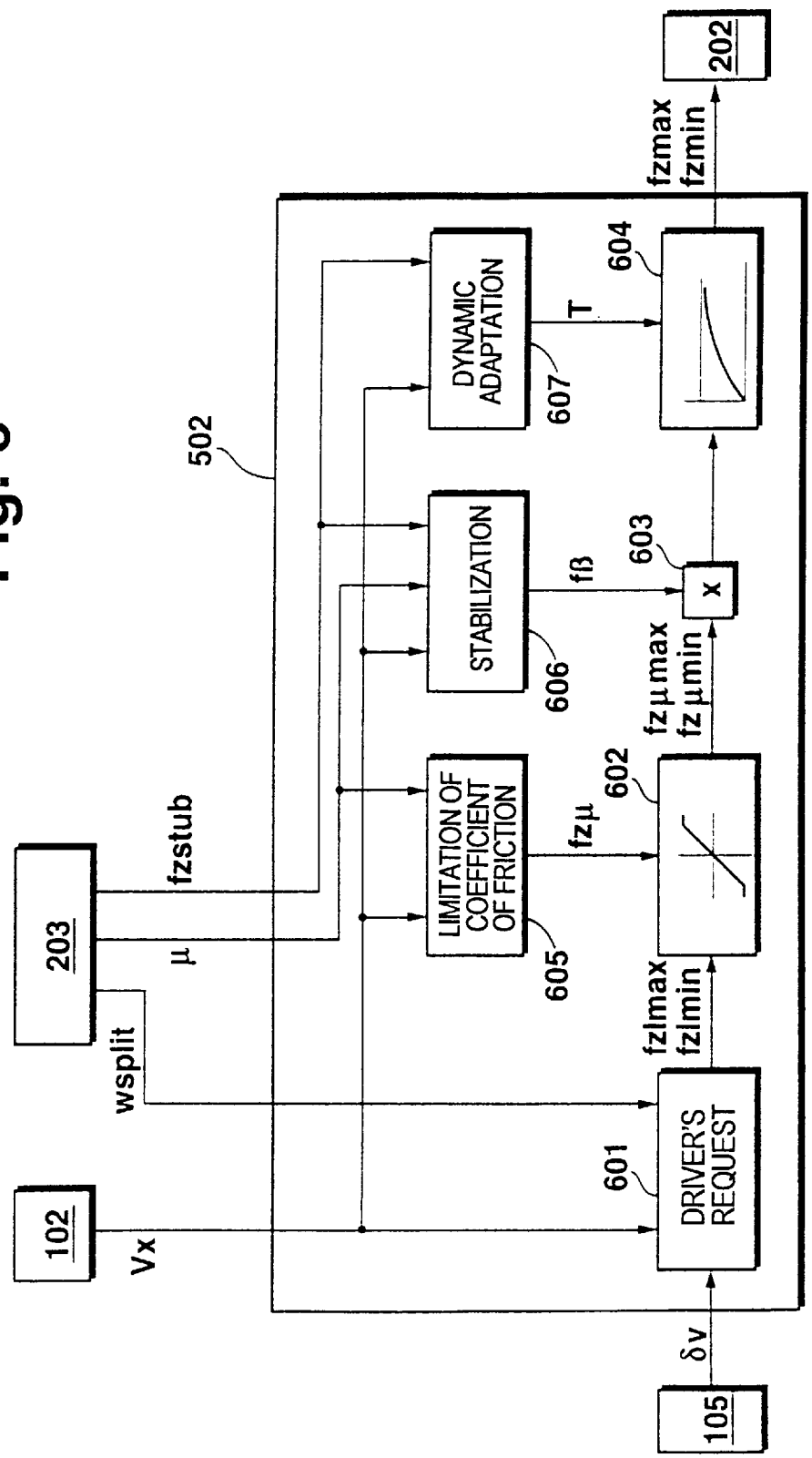
FIG. 6 is a detailed diagram of the functions of the first submodule.

FIG. 2 shows in more detail the second controller component, or the second module 101. Here, the division of the module 101 into a first submodule 201, a second submodule 202 and a third submodule 203 can be seen. The longitudinal speed Vx of the vehicle is fed from the first controller component 102 to the first submodule 201 as are the steering angle $\delta_y$ of the sensor 105 and optionally the lateral acceleration $a_y$ of the vehicle and/or the yaw angle speed ω of the sensor, or sensors 104. Furthermore, the output signals $fz_{stab}$, $W_{split}$ and $\mu$ of the third submodule 203 to be described later are supplied to the first submodule 201. A desired range for the control variables which is characterized by the limits $fz_{min}$ and $fz_{max}$ is formed in the first submodule 201 as a function of the input signals. FIGS. 5 and 6 should be referred to for the more precise functioning of the first submodule 201. In summary, it is possible to say at this point that the reference variable or a desired range of control variables is formed by means of the first submodule 201 for the purpose of controlling according to the invention.

The longitudinal speed of the vehicle (output signal of the first controller component 102) and the lateral acceleration $a_y$ of the vehicle and/or the yaw angle speed ω (output signal of the sensor 104) are supplied to the second submodule 202. Furthermore, the output signals, which have already been mentioned, of the third submodule 203 which is still to be described are present at the second submodule 202. The second submodule will be described more precisely with reference to FIG. 3, but it is possible to say in summary at this point that a control variable $fz_{act}$ is formed here as a function of the detected dynamics of the vehicle. This control variable is compared with the reference variable formed in the first submodule 201 or the desired range ($fz_{min}$, $fz_{max}$) of control variables, the signals Sij being formed in order to influence the wheel brakes 106ij with the effect of approximating the control variable to the corresponding reference variable or with the effect that the control variable remains in the desired range of reference variables or control variables. The second submodule 202 therefore constitutes the actual core of the second controller.

The brake actuation times Tij, already mentioned, are fed from the first controller component 102 to the third submodule 203, as are the longitudinal speed Vx of the vehicle, the steering angle $\delta_v$ and the lateral acceleration $a_y$ of the vehicle or the yaw angle speed $\omega$. By means of the third submodule 203, output variables $fz_{stab}$, $w_{split}$ and $\mu$ are formed which describe the current travel situation or environmental influences to which the vehicle is subjected. For the more precise functioning of the third submodule 203, FIG. 4 will be referred to.

In summary, FIG. 2 shows a modular design of the second controller component 101.

Figure 3:
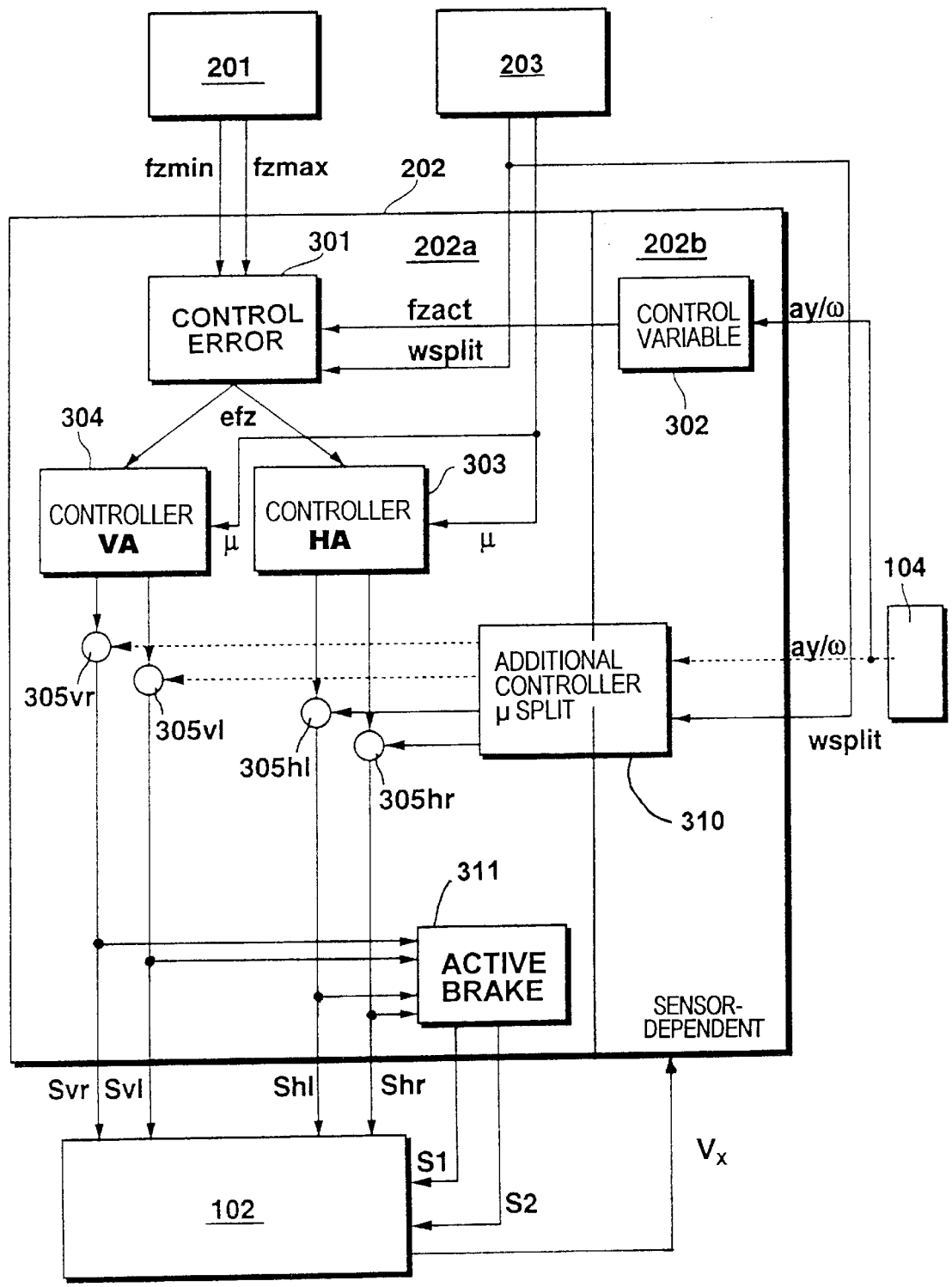
FIG. 3 is a detailed diagram of the second submodule.

FIG. 3 shows the more precise functioning of the second submodule 202. In the unit 302, a control variable $fz_{act}$ is formed here as a function of the longitudinal speed Vx of the vehicle, as a function of the lateral acceleration $a_y$ of the vehicle and/or as a function of the yaw angle speed $\omega$. This takes place in that a vehicle model (or a simple calculation rule which is based on the geometry of the vehicle) is stored in the unit 302. An instantaneous value $fz_{act}$ of the control variable can be identified in a known manner by means of a vehicle model as a function of the detected longitudinal speed of the vehicle, lateral acceleration of the vehicle and yaw speed variables which represent the instantaneous dynamics of the vehicle. This control variable is supplied to the unit 301 in order to determine the control error. Furthermore, the limits $fz_{min}$ and $fz_{max}$ of the desired range of control variables is present at the unit 301. In addition, the variable $w_{split}$ (output variable of the third submodule 203) is also supplied to the unit 301. In the unit 301, the control variable $fz_{act}$ is now compared with the desired range of control variables which is determined by the limits $fz_{min}$ and $fz_{max}$. If the control variable $fz_{act}$ is not within the desired range of control variables, a corresponding control error signal $e_{fz}$ is present at the output side of the unit 301. The signal $w_{split}$ of the third submodule 203 can be additionally used during the formation of the control error signal $e_{fz}$. As is still to be described with reference to FIG. 4, this signal indicates whether the vehicle is in a so-called $\mu$ split situation, that is to say whether the coefficients of friction of the roadway on the right-hand and left-hand sides of the vehicle differ to a certain degree. The control error signal $e_{fz}$ is fed on the one hand to the controller HA for the rear axle 303 and to the controller VA for the front axle 304. Here, signals for actuating the wheel brakes at the rear axle or front axle are formed from the control error $e_{fz}$ taking into account the identified coefficient of friction $\mu$. Depending on whether the vehicle is oversteered or understeered, individual wheels are therefore overbraked or under-braked. In this way, the control variable $fz_{act}$ is returned to the desired range of control variables. The actuation signals for the wheel brakes can be modified by the additional controller 310. Such modifications by the additional controller 310 are used in particular if the $\mu$ split conditions already described are detected by the third submodule 203, that is to say that it is detected whether the coefficients of friction of the roadway on the right-hand and left-hand sides of the vehicle are extremely different. For this purpose, the corresponding signal $w_{split}$ of the third submodule 203 is fed in the additional controller 310. A signal which represents the lateral acceleration $a_y$ and/or the yaw angle speed $\omega$ can be optionally supplied to the additional controller 310. The rear wheel which is moving on the roadway with the higher coefficient of friction is selectively underbraked by the additional controller 310. If appropriate, as indicated with the broken line, an additional intervention at the front-axle brakes may be provided.

Braking interventions can also be realized by means of the additional active brake controller 311 although the driver of the vehicle does not activate the brake pedal. Without the additional active brake controller 311, the actuation signals, Aii from the first controller component 102, for the wheel brakes are modified only by the output signals Sij of the second submodule 202 or of the second controller component 101. This takes place in that a braking pressure which is applied by the first controller component 102 is either increased or decreased at a wheel by means of the signals Sij. If the driver of the vehicle does not wish to perform a braking process (no activation of the brake pedal), generally no braking pressure is built up by the anti-lock brake system 102. If overbraking or under-braking of a wheel by means of the second controller component 101 or by means of the described controller errors in the second submodule 202 is desired in order to maintain the handling stability, in this case this cannot take place by modifying the actuation signals Aij of the anti-lock brake system 102. By means of the signal Si, the anti-lock brake system 102 reports to the additional controller 311 that the driver is not making a request for braking and thus corresponding pressure is not built up. If it is established, by the additional controller 311 tapping the signals Sij, that individual wheel brakes are to be activated, the corresponding braking pressure is made available to the anti-lock brake system 102 by means of the signal S2 from the additional controller 311. For example, a front wheel can be selectively overbraked by means of the additional active brake controller 311 even though the driver does not activate the brake pedal. Of course, further wheels can be additionally braked if necessary.

Figure 4:
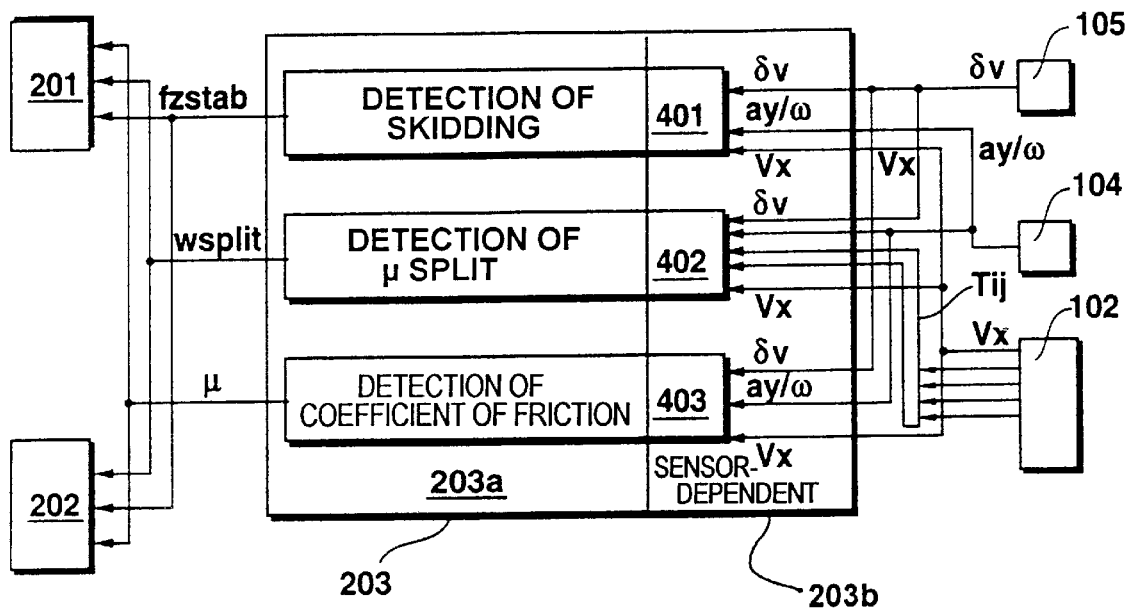
FIG. 4 is a detailed diagram of the third submodule.

The mode of operation of the third submodule 203 will be described with reference to FIG. 4. This sub-module consists of a device for detecting skidding 401, a $\mu$ split detection device 402 and a device 403 for detecting the coefficient of friction.

The steering angle signals $\delta_v$ (sensor 105), the lateral acceleration $a_y$ and/or the yaw angle speed $\omega$ (sensor 104) and the longitudinal speed Vx of the vehicle are fed to the device 401 for detecting skidding. The measured vehicle-dynamic data are compared with a reference model of the vehicle in a known manner in the device 401 for detecting skidding. This reference model indicates at which vehicle-dynamic data the vehicle can still be controlled or is still stable. As a function of this comparison, the variable $fz_{stab}$ is formed as an output variable of the device 401 for detecting skidding. This variable can either assume two or more discrete values or continuously indicate to what extent the vehicle is still stable.

In the device 402 for detecting $\mu$ split, the $w_{split}$ variable is acquired on the basis of signals of the steering angle sensor, the sensor for the lateral acceleration of the vehicle and/or the sensor for the yaw speed, the actuation time Tij of the individual wheel brakes and the vehicle speed Vx. This variable $w_{split}$ indicates whether the coefficients of friction of the roadway on the right-hand and left-hand sides of the vehicle differ. The pressure differences between the individual wheel brakes can be calculated from the valve actuation times Tij which can be obtained from the anti-lock brake system 102. If these braking pressure differences are compared with the instantaneous steering angle and the instantaneous lateral acceleration (or optionally the instantaneous yaw angle speed), a measure is obtained of the extent to which the coefficients of friction of the roadway on the right-hand side and on the left-hand side of the vehicle differ. Of course, instead of the valve actuation times Tij the braking pressures of the individual wheel brakes can also be detected directly, which however requires an extended sensor system. The output signal $W_{split}$ of the device 402 for detecting $\mu$ split can either be configured to be digital ($\mu$ split condition yes or no), a multi-level signal or a continuous signal.

The signals of the steering angle, the lateral acceleration of the vehicle and/or the yaw angle speed and the longitudinal speed of the vehicle are fed to the device 403 for detecting the coefficient of friction. A comparison with a reference model of the vehicle also takes place in the device 403 for detecting the coefficient of friction, a coefficient of friction signal $\mu$ also being present on the output side as the result of the comparison.

By means of the described device 203 for detecting the situation (third submodule), the entire controller component 101 can therefore be adapted very precisely to the respective travel situation, and to the currently present environmental situation to which the vehicle is subjected.

FIG. 5 shows the more precise mode of operation of the first submodule 201. In particular the steering angle $\delta_v$ and the longitudinal speed Vx of the vehicle are fed to a unit 502. A reference variable ($fz_{des}$ and the limits $fz_{min}$, $fz_{max}$) is formed by means of a vehicle model. One particular feature of this part of the exemplary embodiment consists in the fact that the desired range of control variables already mentioned is calculated. This can take place as a function of the output signals of the third submodule 203, as well as as a function of the steering angle $\delta_v$ and the longitudinal speed Vx of the vehicle. In this regard, a more precise description will be given with reference to FIG. 6.

In the unit 601 of FIG. 6, a first upper limit $fz_{lmax}$ and a lower limit $fz_{lmin}$ are determined as a function of the detected steering angle $\delta_v$, the longitudinal speed Vx of the vehicle and the output signal $w_{split}$ of the device for detecting $\mu$ split (third submodule 203). Therefore, a desired range for a roadway with a high coefficient of friction is initially derived from the steering movement of the driver by means of the unit 601 using a vehicle model. This first desired range is corrected by means of adaptation of the coefficient of friction (605 and 602) in order to prevent the vehicle skidding on a smooth roadway. For this purpose, the longitudinal speed Vx of the vehicle, and the coefficient $\mu$ of friction of the roadway determined in the third submodule 203 are fed to the coefficient of friction limiter 605. The variable $fz_\mu$ which corrects the limits identified in the unit 601 is identified from these. These corrected limits are designated in FIG. 6 by $fz_{\mu max}$ and $fz_{\mu min}$.

If, nevertheless, a tendency to skid occurs, the desired range undergoes a further adaptation (606, 603) in order to stabilize the vehicle. For this purpose, the longitudinal speed Vx of the vehicle, the identified coefficient $\mu$ of friction of the roadway and the stability variable $fz_{stab}$ are fed to the stabilizing device 606. In order to correct the limits, the variable $f_\alpha$ is formed on the output side of the stabilizing device 606 and included multiplicatively in the logic connection 603 during the limit formation.

The steady-state desired range determined in this way (output of the multiplication stage 603) is finally provided with desired dynamics by means of the unit 607 or 604. For this purpose, the longitudinal speed Vx of the vehicle and the stability variable $fz_{stab}$ (output signal of the third submodule 203) are fed to the dynamic adaptation device 607. The dynamic signal T with which the steady-state desired range is made dynamic by means of the unit 604 is then located on the output side of the unit 607. This desired range which has been made dynamic then has the limits $fz_{max}$ and $fz_{min}$ already mentioned.

The individual calculation steps of the respectively present travel situation ($\mu$ split, skidding, un-braked, fully braked vehicle) are adapted in the unit 502. In addition, the fuzzy logic method can be applied in each calculation step.

In summary, it is true of the determination 502 of the desired range of control variables that instead of an unambiguous desired value $fz_{des}$, a desired range ($fz_{min}$, $fz_{max}$) for the vehicle movement variable fz is prescribed, which desired range ($fz_{min}$, $fz_{max}$) indicates the maximum permitted lateral dynamics and the minimum required lateral dynamics of the vehicle. The upper limit $fz_{max}$ of the desired range describes a vehicle behavior which in terms of dynamics and absolute size is slightly greater than the natural movement of the vehicle and indicates the stability limit. The lower limit $fz_{min}$ indicates the minimum vehicle reaction to steering movements which is required under unfavorable conditions (below the natural vehicle movement). As a result of the separate specification of the range limits, calculation which is adapted to problems is possible, for example the use of different vehicle models and dynamics for the upper limit (stability) and lower limit (steerability). The second or superordinate controller component 101 must not intervene until the vehicle movement variable fz leaves the acceptable range, described by the desired band.

As a result, unnecessary interventions are avoided and in the case of full braking the subordinate ABS 102 can control undisturbed over relatively long phases. In particular, there may be provision for actuation not to occur until the control variable is outside the desired range. In order to ensure correctly timed intervention, actuation takes place whenever it is clear that the control variable is leaving, or will leave, the desired range. For this purpose, for example the behavior of the control variable fz over time can be evaluated.

Figure 7:
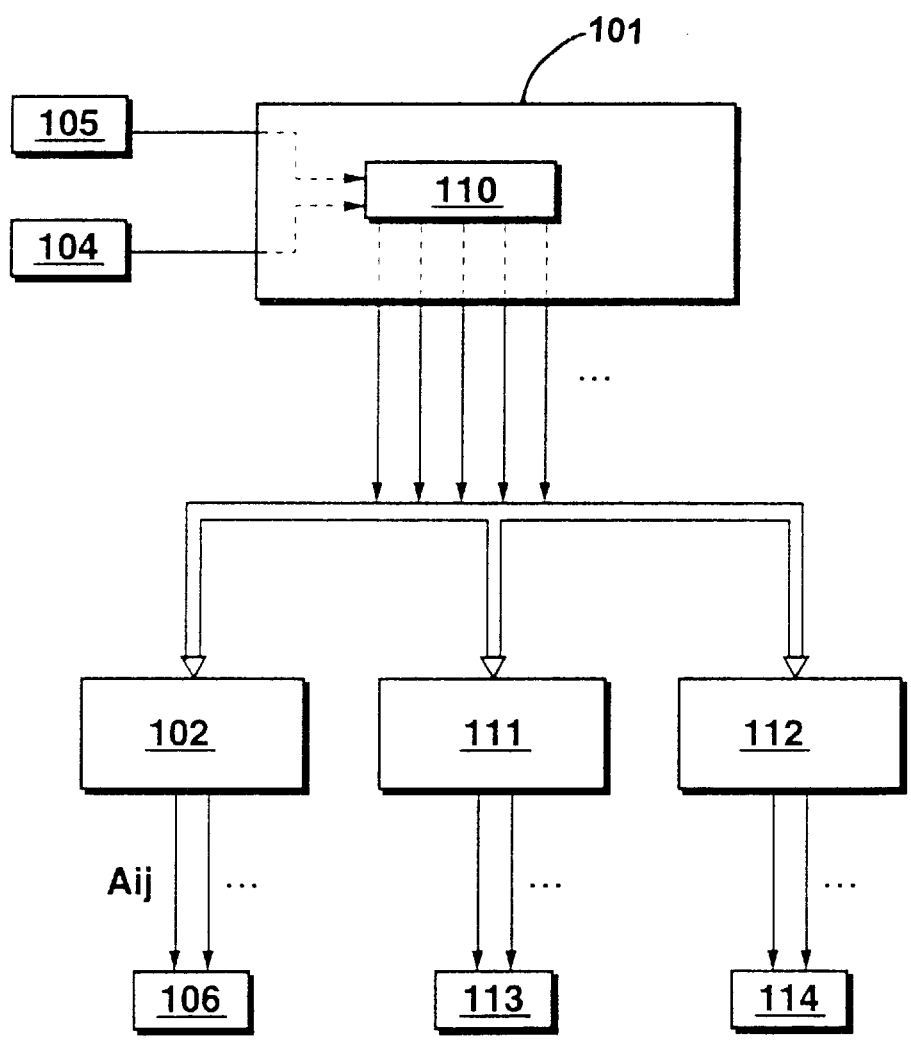
FIG. 7 is a diagram illustrating the cooperation between the superordinate controller and a plurality of subordinate controllers.

With reference to FIG. 7, the extension of the exemplary embodiment to further subsystems, in addition to the described anti-lock brake system 102, will be described. The second controller component 101 has already been described and supplies actuation signals for an extremely wide variety of actuators as a function of sensor signals in the described manner. In the previously described exemplary embodiment, the modification of braking signals within the scope of an anti-lock brake system 102 was represented. However, according to the invention further subsystems can also be influenced by the second controller component 101. In this respect in particular a known traction control device 111 was being considered, by means of which traction control device 111 the wheel slip is controlled by forming actuation signals in order to actuate actuator elements for reducing the wheel drive torque. Furthermore, a gearbox control 112 is provided as a subsystem, by means of which gearbox control 112 the transmission ratio between the vehicle engine and the wheels is adjusted or controlled by forming actuation signals for actuating actuator elements. As a result, a modular vehicle dynamics control device is obtained which is "upwardly compatible" with existing standard controllers 102, 111 and 112. In this way, a hierarchically structured, modular vehicle dynamics control device with a subordinate controller 101 for the vehicle movement and superordinate controllers for braking processes 102 or drive train 111, 112 is obtained. In this context, the subordinate controllers 102, 111, 112 can be conventional standard controllers which only have to be additionally provided with one interface.

In particular there is provision for monitoring means 110 to monitor the correct functioning of the second controller component 101 and/or the sensor system 104, 105, in particular the sensor system whose signals are fed exclusively to the controller component 101. If an incorrect function of the controller component 101 and/or of the sensor system 104, 105 is established by the monitoring means 110, the output signals of the second controller component 101 are, in the simplest case, suppressed. The subordinate controllers 101, 111 and 112 then go into an emergency operating mode which corresponds to the stand-alone series state.

Figure 8:
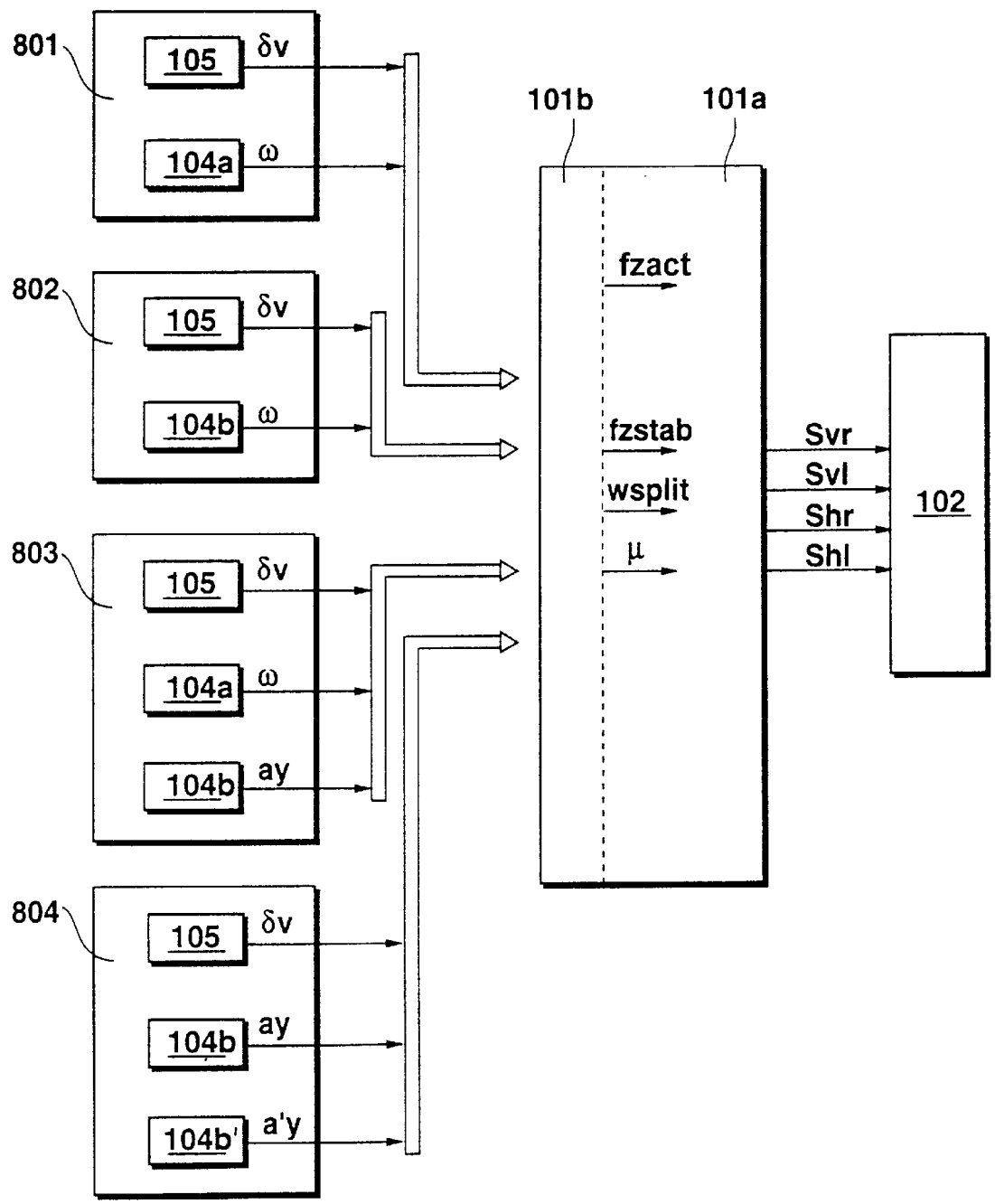
FIG. 8 is a diagram illustrating the different sensor configurations which can provide inputs to the superordinate controller.

A further special feature of the invention will now be referred to with respect to FIG. 8. The controller-internal variables which are used in the second controller means 101, that is to say the control variable $fz_{act}$ and the travel situation variables $fz_{stab}$, $w_{split}$ and $\mu$ are, as described, derived from data which are identified by sensors. However, these controller-internal variables can be detected with different sensor configurations. For this purpose, in FIG. 8 a steering angle sensor 105 and a yaw speed sensor 104a are shown as a first sensor configuration 801. A second sensor configuration for identifying the controller-internal variables is distinguished by the block 802 and consists in turn of the steering angle sensor 105 and the lateral acceleration sensor 104b. A third sensor configuration 803 consists again of the steering angle sensor 105, the yaw speed sensor 104a and the lateral acceleration sensor 104b. Furthermore, in FIG. 8, a steering angle sensor 105 and a plurality of lateral acceleration sensors 104b and 104b' are illustrated as a fourth sensor configuration, the lateral acceleration sensors 104b and 104b' being provided at various points on the vehicle. The described controller-internal variables can be derived from the signals of all four sensor configurations. According to the invention, the second controller component 101 is divided into two areas, a first area being adapted to the respectively selected sensor configuration 801, 802, 803 or 804 while the second area 101a only processes the controller-internal variables which are independent of the sensor configuration, irrespective of the selection of the respective sensor configuration, and outputs the actuation signals Sij. For this purpose, the first area 101b is configured in such a way that the controller-internal variables are formed on the basis of the sensor signals of one sensor configuration.

The flexibility of the control system according to the invention is further increased by this division into a component 110a which is independent of the sensor configuration and a component 101b which is dependent on the sensor configuration. If the control according to the invention is adapted to a vehicle, all that is necessary is to adapt the component 101b to the respectively present sensor configuration while the controller component 101a can remain unchanged. As a result, a low degree of outlay on development and application is permitted.

In order to obtain more details on this part of the invention, FIGS. 2, 3, 4 and 5 will be referred to once more. The blocks already described in these figures are respectively divided into two areas with the identification a and the identification b. This corresponds respectively to the described component which is independent of the sensor configuration (identified with the letter a) and the component which is dependent on the sensor configuration (identified with the supplementary letter b). For example, the vehicle-dynamic modules for detecting situations, prescribing desired values and controlling the vehicle are split up into areas which are independent of the sensor configuration and areas which are dependent on the sensor configuration. The vehicle movement variable $fz_{act}$ or $fz_{des}$, which is always immediately normalized (for example to the lateral acceleration or yaw speed) is used in the areas 101a which are independent of the sensor configuration (for example vehicle model, core of the controller). These areas do not change when another sensor configuration is selected. Possible sensor configuration-dependent areas 101b are

- Calculation of the vehicle movement variable from the respective sensor variables (blocks 302 and 502).
- Functions which are realized differently with different sensor configurations (for example device 401 for detecting skidding).
- Sensor configuration-dependent improvement of the basic function (for example components of the additional controller 310).

In summary, the following is true of the exemplary embodiment presented:

The vehicle dynamics control system presented in the exemplary embodiment is based on the various standalone standard controllers (anti-lock brake system, traction control device, gearbox control device). For example in the case of an anti-lock brake system or a traction control device, the standard sensor system consists primarily of the wheel speed sensors. In the case of a gearbox control device, the engine speed and/or the input speed of the gearbox as well as the output speed at the gearbox and the engine load are generally also measured. In addition to this standard sensor system, the steering angle and the yaw speed and/or the lateral acceleration of the vehicle are detected using sensors. Further variables which are required are estimated on the basis of the existing sensor system. The main objective of the exemplary embodiment described consists in stabilizing the vehicle in critical travel situations. The improvement of the stabilization in critical travel situations is however in particular not only to be ensured in the case of severe braking maneuvers.

What is claimed is:

1. A modular vehicle dynamics control system for controlling a movement variable which represents the movement of a vehicle having actuators for applying a braking force at the wheels, said system comprising detection means for detecting rotational movements of the wheels, a variable which represents the steering angle, and at least one variable selected from the group consisting of a variable which represents the lateral movement and a variable which represents the yaw movement of the vehicle, a first controller component which functions as a first module which forms actuation signals for the actuators with the effect of controlling a first control variable which is determined as a function of at least the detected rotational movements of the wheels, and a second controller component which functions as a second module which forms signals at least as a function of the steering angle variable which modify the actuation signals with the effect of controlling a second control variable determined as a function of at least said selected variable representing the lateral movement or the yaw movement of the vehicle.

2. The modular vehicle dynamics control system as claimed in claim 1, wherein the first control variable represents at least one of the wheel slip and the wheel deceleration and the second control variable is a variable which is associated at least indirectly with one of the lateral movement and the yaw movement of the vehicle.

3. The modular vehicle dynamics control system as claimed in claim 2, wherein the first module functions as an anti-lock brake control system, said system further comprising at least one of
- a traction control module by means of which the wheel slip is adjusted by forming actuation signals for actuating actuator elements in order to reduce the wheel drive torque, and
- a gearbox control module by means of which the transmission ratio between the engine of the vehicle and the wheels is adjusted or controlled by forming actuation signals for actuating actuator elements.

4. The system according to claim 1, and the signals from said second controller component modifying said actuation signals modifying said actuation signals independently of the consequences of said modification on said first control variable on which the first controller component forms said actuation signals.

5. The system according to claim 4, and
- the signals from said second controller component modifying said actuation signals modifying said actuation signals after the formation thereof.

6. The modular vehicle dynamics control system as claimed in claim 1 further comprising monitoring means for monitoring at least one of the second module and the means for detecting the variable which represents the steering angle and the variable which represents the lateral movement and the yaw movement of the vehicle, the formation of the signals modifying the actuation signals being suppressed in reaction to incorrect functioning determined by the monitoring means.

7. The modular vehicle dynamics control system as claimed in claim 1, wherein the controller-internal variables which are used in the second module can be detected as a function of sensor signals of a selected sensor configuration, and the second module has two areas wherein
- the first area is adapted to the selected sensor configuration in such a way that the controller-internal variables are formed on the basis of the sensor signals, and
- the second area is configured to process the controller-internal variables independently of the selection of the sensor configuration.

8. The modular vehicle dynamics control system as claimed in claim 1, wherein the second module comprises
- a first submodule which determines a reference variable as a function of at least the longitudinal vehicle speed which is derived from the rotational movements of the wheels and the variable which represents the steering angle; and
- a second submodule which forms the second control variable and compares it with the determined reference variable in order to form the signals modifying the actuation signals of the actuators.

9. The modular vehicle dynamics control system as claimed in claim 8, wherein the second module has a third submodule by means of which a variable which represents the current travel situation status is determined as a function of at least the detected rotational movements of the wheel and at least one of the variables which represent the lateral movement and the yaw movement of the vehicle, and this variable is fed to at least the first or the second submodule.

10. The modular vehicle dynamics control system as claimed in claim 9, wherein the third submodule comprises at least one of

- a device for detecting skidding, by means of which a variable which represents the vehicle stability as formed, by means of a vehicle model, as a function of at least the detected variable which represents the steering angle and at least one of the detected variables which represent the lateral movement or the yawing movement of the vehicle,
- a device for detecting $\mu$ split, by means of which a variable is formed at least as a function of the detected variable which represents the steering angle, at least one of the detected variables which represent the lateral movement and the yawing movement of the vehicle and the actuation signals of the actuators, said variable being representative of whether the coefficients of friction of the roadway on the right-hand side and the left-hand side of the vehicle differ to a specific degree, and
- a device for detecting a coefficient of friction, by means of which a variable which represents the coefficient of friction of the roadway is formed, by means of a vehicle model, at least as a function of the detected variable which represents the steering angle and at least one of the detected variables which represent the lateral movement or the yawing movement of the vehicle.

11. The modular vehicle dynamics control system as claimed in claim 8, wherein the first submodule forms two limit values from at least the variable which represents the steering angle and a variable which represents longitudinal vehicle speed, by means of a vehicle model.

12. The modular vehicle dynamics control system as claimed in claim 11, wherein the two limit values are formed as a function of at least one variable which represents the current travel situation.

13. The modular vehicle dynamics control system as claimed in claim 11, wherein the actuation signals of the actuators are only modified by means of the signals modifying the actuation signals if the second control variable is outside the limit values or leaves the desired range established by the limit values.

14. A modular vehicle dynamics control system for controlling a movement variable which represents the movement of a vehicle having actuators for applying a braking force at the wheels, said system comprising
- detection means for detecting rotational movements of the wheels, a variable which represents the steering angle, and at least one of variables which represents the lateral movement and which represents the yaw movement of the vehicle,
- first and second controller components each being a respective discrete module,
- said second controller component forming signals as a function of the steering angle variable and at least one variable selected from the group consisting of a variable representing lateral movement of the vehicle and a variable representing yaw movement of the vehicle, and
- said first controller component forming signals for the actuators, said signals being formed as a function of the rotational movements of the wheels and then subsequently adjusted based on the signals formed by the second controller component.

* * * * *